US010270274B1

(12) United States Patent
Beagley et al.

(10) Patent No.: US 10,270,274 B1
(45) Date of Patent: Apr. 23, 2019

(54) ACTIVE POWER MANAGEMENT

(71) Applicant: Vivint, Inc., Provo, UT (US)

(72) Inventors: James Beagley, Taylorsville, UT (US); Jason C. Flint, Highland, UT (US); Scott Bevan, Lehi, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/852,244

(22) Filed: Dec. 22, 2017

Related U.S. Application Data

(63) Continuation of application No. 15/233,102, filed on Aug. 10, 2016, now Pat. No. 9,859,741.

(51) Int. Cl.
*H02J 7/00* (2006.01)
*G08B 3/10* (2006.01)

(52) U.S. Cl.
CPC ................ *H02J 7/007* (2013.01); *G08B 3/10* (2013.01); *H02J 2007/0096* (2013.01)

(58) Field of Classification Search
None
See application file for complete search history.

(56) References Cited

U.S. PATENT DOCUMENTS

| | | | | |
|---|---|---|---|---|
| 5,428,388 A | 6/1995 | von Bauer et al. | | |
| 5,894,262 A | 4/1999 | McCavit et al. | | |
| 6,380,852 B1 * | 4/2002 | Hartman | H04B 15/02 | 307/116 |
| 7,015,943 B2 | 3/2006 | Chiang | | |
| 8,872,915 B1 | 10/2014 | Scalisi et al. | | |
| 8,907,807 B2 | 12/2014 | Huang et al. | | |
| 9,859,741 B1 * | 1/2018 | Beagley | H02J 7/007 | |
| 2003/0122665 A1 * | 7/2003 | Kaje | G08C 23/04 | 340/531 |
| 2014/0266669 A1 * | 9/2014 | Fadell | G05B 19/042 | 340/501 |
| 2015/0029009 A1 * | 1/2015 | Scalisi | H04N 7/186 | 340/328 |

FOREIGN PATENT DOCUMENTS

CN 203607912 U 5/2014

* cited by examiner

*Primary Examiner* — Leon Viet Q Nguyen
(74) *Attorney, Agent, or Firm* — Holland & Hart, LLP

(57) ABSTRACT

A method for security and/or automation systems is described. In one embodiment, the method may include receiving, at a power adapter, power from a power supply, routing a first portion of the power received from the power supply to the doorbell unit, and routing a second portion of the power received from the power supply to both the device of the doorbell unit and the doorbell chime when the doorbell button is being actuated. In some cases, the power adapter is wired, via doorbell wiring, to at least one of a doorbell chime, a doorbell unit, and the power supply. In one example, the first portion of power is routed to power a device of the doorbell unit when a doorbell button of the doorbell unit is not being actuated.

16 Claims, 13 Drawing Sheets

ACTIVE POWER MANAGEMENT

CROSS-REFERENCE TO RELATED APPLICATIONS

The present application is a continuation of U.S. patent application Ser. No. 15/233,102, filed Aug. 10, 2016, titled "ACTIVE POWER MANAGEMENT," and assigned to the assignee hereof, the disclosure of which is expressly incorporated herein by this reference.

BACKGROUND

The present disclosure, for example, relates to security and/or automation systems, and more particularly to active power management.

Security and automation systems are widely deployed to provide various types of communication and functional features such as monitoring, communication, notification, and/or others. These systems may be capable of supporting communication with a user through a communication connection or a system management action.

An automated doorbell may include one or more sensors in addition to a doorbell button. The automated doorbell may be wired to provide power to the one or more sensors. When the doorbell button is pressed, however, power may be diverted to ring the chime. While the power is diverted, elements of the doorbell may lose at least some functionality.

SUMMARY

The disclosure herein includes methods and systems for active power management to improve system functions and user experience in relation to an automation system. The system may include a power management system to control power distribution between a chime and elements of a doorbell. The power management system continues to provide power to the doorbell and/or other elements whether or not the doorbell button is being actuated.

A method for security and/or automation systems is described. In one embodiment, the method may include receiving, at a power adapter, power from a power supply, routing a first portion of the power received from the power supply to the doorbell unit, and routing a second portion of the power received from the power supply to both the device of the doorbell unit and the doorbell chime when the doorbell button is being actuated. In some cases, the power adapter is wired, via doorbell wiring, to at least one of a doorbell chime, a doorbell unit, and the power supply. In one example, the first portion of power is routed to power a device of the doorbell unit when a doorbell button of the doorbell unit is not being actuated.

In one embodiment, the method may include modulating a power signal routed to the device of the doorbell unit, monitoring, via a processor of the doorbell unit, the doorbell button to determine when the doorbell unit is being actuated, and communicating, via the modulated power signal, data to the power adapter. In some cases, the data indicates whether the doorbell button is being actuated. The data may be communicated over the doorbell wiring.

In one embodiment, the method may include routing a third portion of the power received from the power supply to a rechargeable energy storage unit when the doorbell button is not being actuated. In some cases, the third portion of the power routed to the rechargeable energy storage unit varies according to a determination made by a processor of the doorbell unit, a processor of the power adapter, a processor of the chime, and/or an external processor such as a processor of a control panel.

In one example, the rechargeable energy storage unit includes at least one of a rechargeable battery, fuel cell, and capacitor. The rechargeable energy storage unit may be configured to provide power to both the device of the doorbell unit and the doorbell chime when the doorbell button is being actuated. In some cases, the power from the power supply is received by the power adapter via the doorbell wiring. At least a portion of the doorbell wiring may include preexisting doorbell wiring. In some cases, the preexisting doorbell wiring was used to power a previous doorbell unit prior to installing the doorbell unit. The doorbell unit may include at least one of an image sensor, a motion sensor, a proximity sensor, and an audio sensor. The power supply may include a doorbell transformer.

An apparatus for security and/or automation systems is also described. In one embodiment, the apparatus may include a processor, memory in electronic communication with the processor, and instructions stored in the memory, the instructions being executable by the processor to perform the steps of receiving, at a power adapter, power from a power supply, routing a first portion of the power received from the power supply to the doorbell unit, and routing a second portion of the power received from the power supply to both the device of the doorbell unit and the doorbell chime when the doorbell button is being actuated. In some cases, the power adapter is wired, via doorbell wiring, to at least one of a doorbell chime, a doorbell unit, and the power supply. In one example, the first portion of power is routed to power a device of the doorbell unit when a doorbell button of the doorbell unit is not being actuated.

A non-transitory computer-readable medium is also described. The non-transitory computer readable medium may store computer-executable code, the code being executable by a processor to perform the steps of receiving, at a power adapter, power from a power supply, routing a first portion of the power received from the power supply to the doorbell unit, and routing a second portion of the power received from the power supply to both the device of the doorbell unit and the doorbell chime when the doorbell button is being actuated. In some cases, the power adapter is wired, via doorbell wiring, to at least one of a doorbell chime, a doorbell unit, and the power supply. In one example, the first portion of power is routed to power a device of the doorbell unit when a doorbell button of the doorbell unit is not being actuated.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
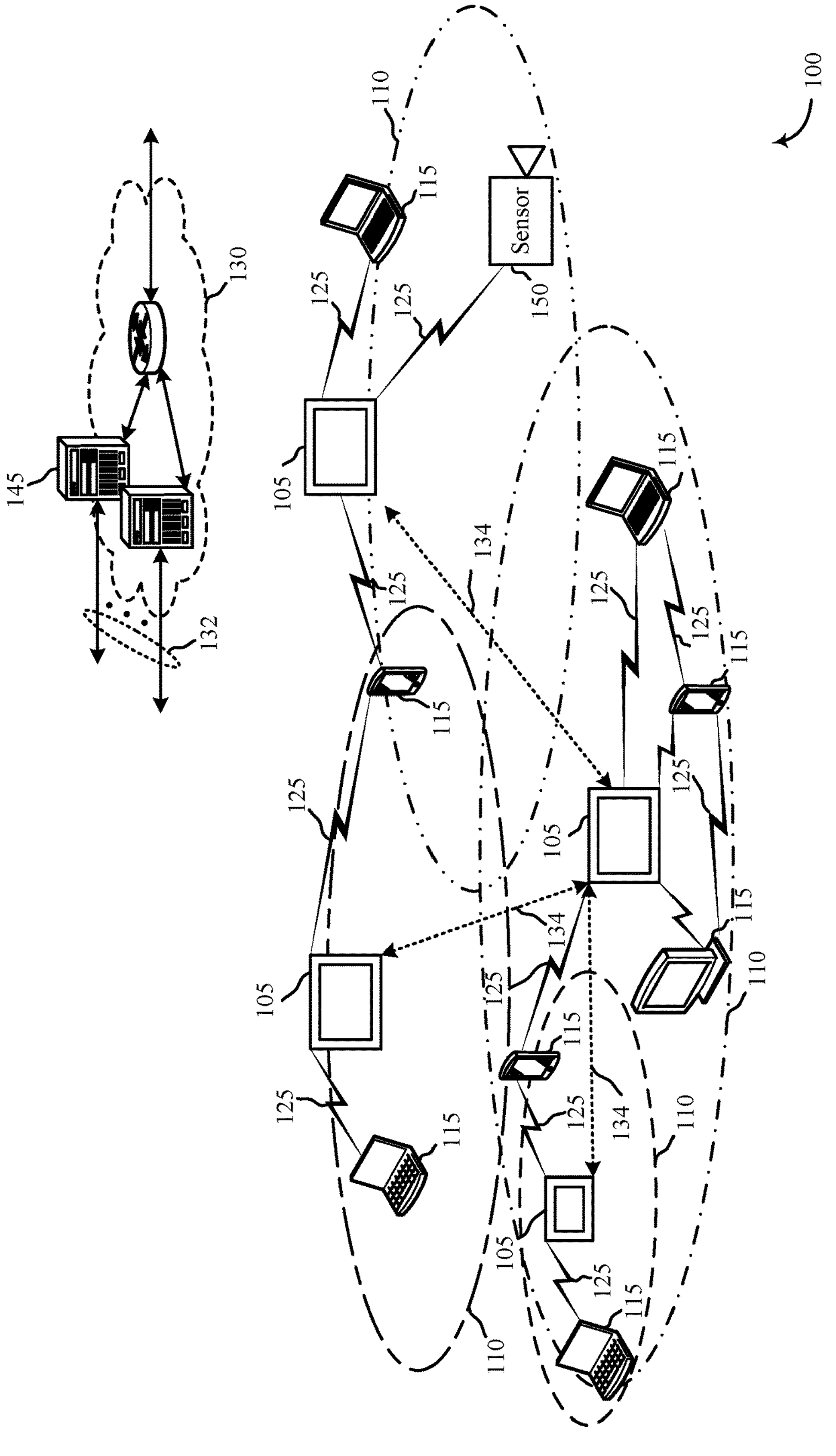
FIG. 1 is a block diagram of an example of a security and/or automation system in accordance with various embodiments.

The following relates generally to automation and/or security systems. Automation systems may include one or more sensors located at an entrance to a premises. For example, sensors located at the entrance may include an image sensor, a motion sensor, a proximity sensor, and/or an audio sensor, among others.

A device, such as a doorbell unit, at an entrance of a premises may include one or more sensors, such as an image sensor and/or some other sensor or device. The device may also include a security camera, image sensor, garage unit, door monitor, window monitor, and/or other device that may have power needs that can be augmented by the present systems and/or methods. The image sensor may be configured with a field of view relative to an entrance of a premises. For example, the camera may be configured to capture a view of an occupant of the premises approaching the entrance to enter the premises, a visitor approaching the entrance and knocking on a door at the entrance, and/or a delivery person approaching the entrance to deliver a package. Thus, the image sensor may be configured to capture images (e.g., video and/or photos) of such persons, animals, and/or other objects at the entrance. The image sensor and/or the other sensor or device, however, may share power with the device (e.g., doorbell unit). The doorbell unit may include a button that when actuated (e.g., pressed, turned, lifted, twisted, slid, triggered, switched from one position to another, etc.) activates a chime and draws power away from the image sensor and/or the other sensor. In some cases, actuating the button may be done remotely such as by an application running on a smartphone, etc. When the chime is active the image sensor may lose power and/or have its level significantly reduced, temporarily deactivating the image sensor and/or causing other problems (e.g., poor performance, failure, triggering a restart or reboot, etc.).

Aspects of the invention relate to systems, methods, and related devices for power management of automation systems. The systems and methods may be configured to provide power to one, two, or more devices associated with a doorbell unit in an automation system. In one embodiment, the devices may include a doorbell chime, an image sensor, a motion sensor, a proximity sensor, and/or an audio sensor. The doorbell unit may include one or more sensors housed within the doorbell unit, and/or the doorbell unit may be connected to an external doorbell chime via wiring.

In one example, the doorbell unit may be powered by a power supply. The power supply may include a transformer to transform a current such as transforming 120 VAC to 24 VDC, etc. The doorbell unit may be wired to the doorbell transformer using preexisting two-wire doorbell wiring (e.g., wiring that pre-dates the device and/or that was used to power a different device). The doorbell unit may also be wired to a power adapter. The power adapter may be wired, via the doorbell wiring, to the doorbell chime, the doorbell unit, and/or the power supply. Wired and/or wireless communications may enable the power adapter, doorbell chime, doorbell unit, a computing device, and/or a control panel of an automation system to communicate with each other.

In some embodiments, the doorbell unit may be connected wirelessly to the doorbell transformer, power adapter, and/or doorbell chime. For example, the doorbell unit may be battery-operated and/or derive power from another source, and send wireless signals to the doorbell transformer, power adapter, and/or doorbell chime. Thus, when the doorbell button of the wireless doorbell unit is actuated, the wireless doorbell unit may wirelessly communicate to the doorbell transformer, power adapter, and/or doorbell chime that the doorbell button and/or another element is being actuated.

The power adapter may provide the power received from the power supply to the doorbell unit when a doorbell button of the doorbell unit is not being actuated. This power enables the doorbell unit to power a device such as the one or more sensors listed above. When the doorbell button is pressed, the power adapter may route the power received from the power supply to both the device of the doorbell unit and a doorbell chime, among other things. Thus, while a person actuates a doorbell button, power may be provided to an audio sensor of the doorbell unit to enable the audio sensor to detect audio. Thus, the power adapter may enable a sensor of the doorbell unit to operate without interruption regardless of whether the doorbell button is being actuated or not.

In some embodiments, while the doorbell button is not being actuated, the power adapter may route at least a portion of the power received from the power supply to a storage device, such as a capacitor and/or a rechargeable battery. The rechargeable battery may be configured to provide power to a device of the doorbell unit and/or the doorbell chime when the doorbell button of the doorbell unit is being pressed. In some cases, the power adapter may be configured to provide a fixed, predetermined amount of power to charge the rechargeable battery.

In some cases, the power provided to charge the capacitor or the rechargeable battery may vary. For example, a processor may determine a first amount of power to provide to the rechargeable battery. Subsequently, the processor may determine a second amount of power to provide to the rechargeable battery, the second amount being different from the first amount. The determination may be based on an amount of power provided by the power supply, an amount of power currently being used, a number of devices presently using the provided power, etc. The processor may represent one or more processors located in the power adapter, the doorbell unit, the chime, a control panel, a computing device, and/or some other component, etc. In some cases, data indicating a value associated with the portion of the power to be routed to the rechargeable battery may be communicated to the doorbell adapter via the doorbell wiring and/or via a wireless connection.

FIG. 1 illustrates an example of a communications system 100 in accordance with various aspects of the disclosure. The communications system 100 may include control panels 105, devices 115, a network 130, and/or sensors 150. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communicate with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business, etc.) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary or mobile. A device 115 may include an entrance unit, a doorbell unit (e.g., a doorbell camera, etc.), a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, a key fob, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, facial recognition, facial features, and/or other inputs that relate to a security and/or an automation system. In some cases, sensor 150 may include one or more sensors of a positioning system. A device 115 and/or a sensor 150 may be able to communicate through one or more wired and/or wireless connections with various components such as control panels, base stations, and/or network equipment (e.g., servers, wireless communication points, etc.) and/or the like. For example, device 115 and/or a sensor 150 may communicate over doorbell wiring, or the two wires connected to a doorbell where one wire runs to a power supply and the other runs to a chime.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same and/or different coded data.

While the devices 115 may communicate with each other and/or with one or more other sensors 150 through the control panel 105 using communication links 125, each device 115 may also communicate directly with one or more other devices 115 and/or one or more sensors 150 via one or more direct communication links 125. Two or more devices 115 may communicate via a direct communication link 125 when both devices 115 are in the geographic coverage area 110, one of devices 115 is in the geographic coverage area 110, and/or when one or neither of devices 115 are within the geographic coverage area 110. Examples of direct communication links 125 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

Figure 2:
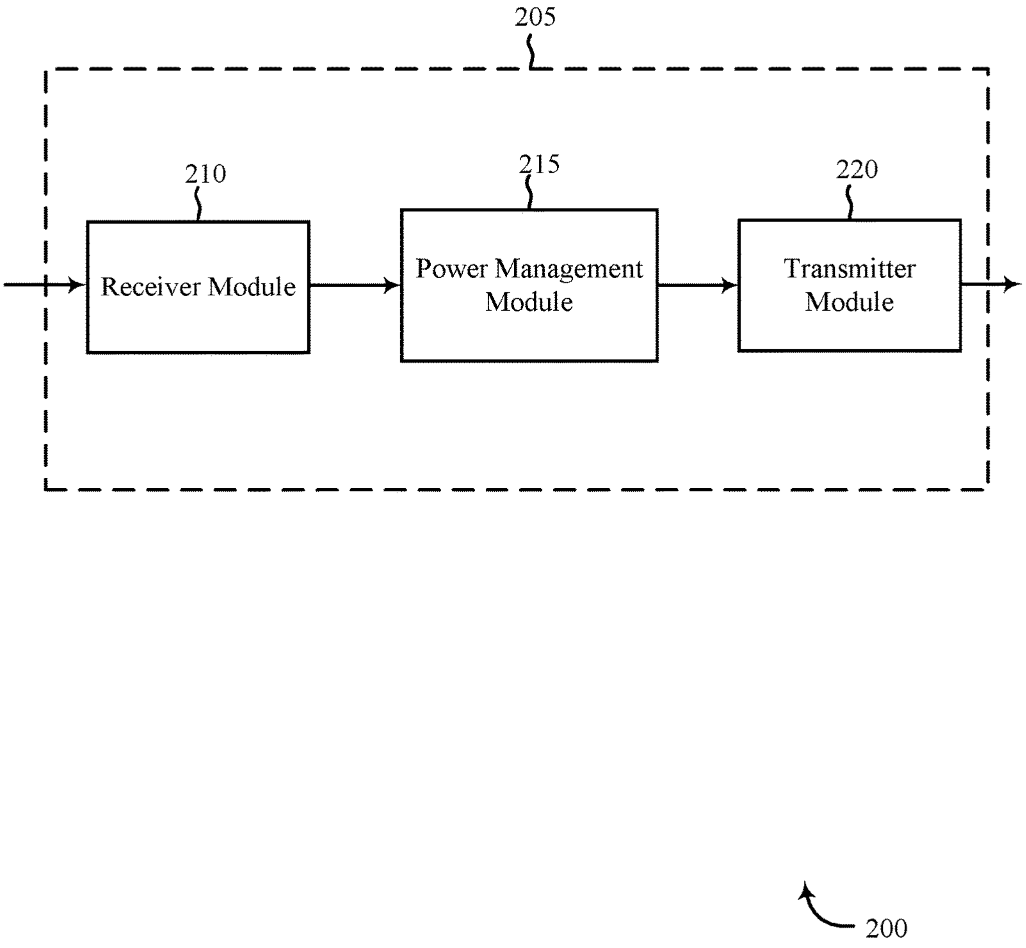
FIG. 2 shows a block diagram of a device relating to a security and/or an automation system, in accordance with various aspects of this disclosure.

FIG. 2 shows a block diagram 200 of an apparatus 205 for use in electronic communication, in accordance with various aspects of this disclosure. The apparatus 205 may be an example of one or more aspects of a control panel 135 and/or a device 115 described with reference to FIG. 1. The apparatus 205 may include a receiver module 210, a power management module 215, and/or a transmitter module 220. The apparatus 205 may also be or include a processor. Each of these modules may be in communication with each other—directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, apparatus 205 includes a doorbell unit. Additionally, or alternatively, apparatus 205 may include a chime and/or a power supply. In some cases, apparatus 205 includes a power adapter located between a doorbell unit and a chime, and/or between a power supply and a chime.

The receiver module 210 may receive information such as packets, user data, and/or control information associated with various information channels (e.g., control channels, data channels, etc.). The receiver module 210 may be configured to receive audio signals (e.g., audio signals via a microphone on a doorbell unit) and/or image signals (e.g., photo images, video images, etc., via a camera on a doorbell unit), among others. In some cases, receiver module 210 may receive data indicating a doorbell button is being actuated and/or has been actuated. Information may be passed on to the power management module 215, and to other components of the apparatus 205.

The power management module 215 may be configured to perform active power management. Power management module 215 may be configured to receive power from a power supply and distribute the received power according to the current state of a doorbell unit, among other things. The doorbell unit may include one or more sensors such as motion sensors, proximity sensors, vibration sensors, audio sensors, camera sensors, etc. In one example, the power management module 215 may provide at least a portion of the power received to the one or more sensors of the doorbell unit when a doorbell button is not being pressed. When the button is pressed, the power management module 215 may continue to provide at least a portion of the power received to the one or more sensors of the doorbell unit via an alternate current source. The alternate current source may be activated when the doorbell button is pressed and/or actuated. Thus, power management module 215 may provide power to the doorbell unit whether or not the doorbell button is being pressed and/or actuated.

The transmitter module 220 may transmit the one or more signals received from other components of the apparatus 205 and/or other elements of the system. The transmitter module 220 may transmit audio signals (e.g., audio signals via a microphone on a doorbell unit) and/or image signals (e.g., photo images, video images, etc., via a camera on a doorbell unit). In some cases, transmitter module 220 may transmit data indicating a doorbell button is being triggered. Information may be passed on to other components within the apparatus 205 and/or outside of apparatus 205.

Figure 3:
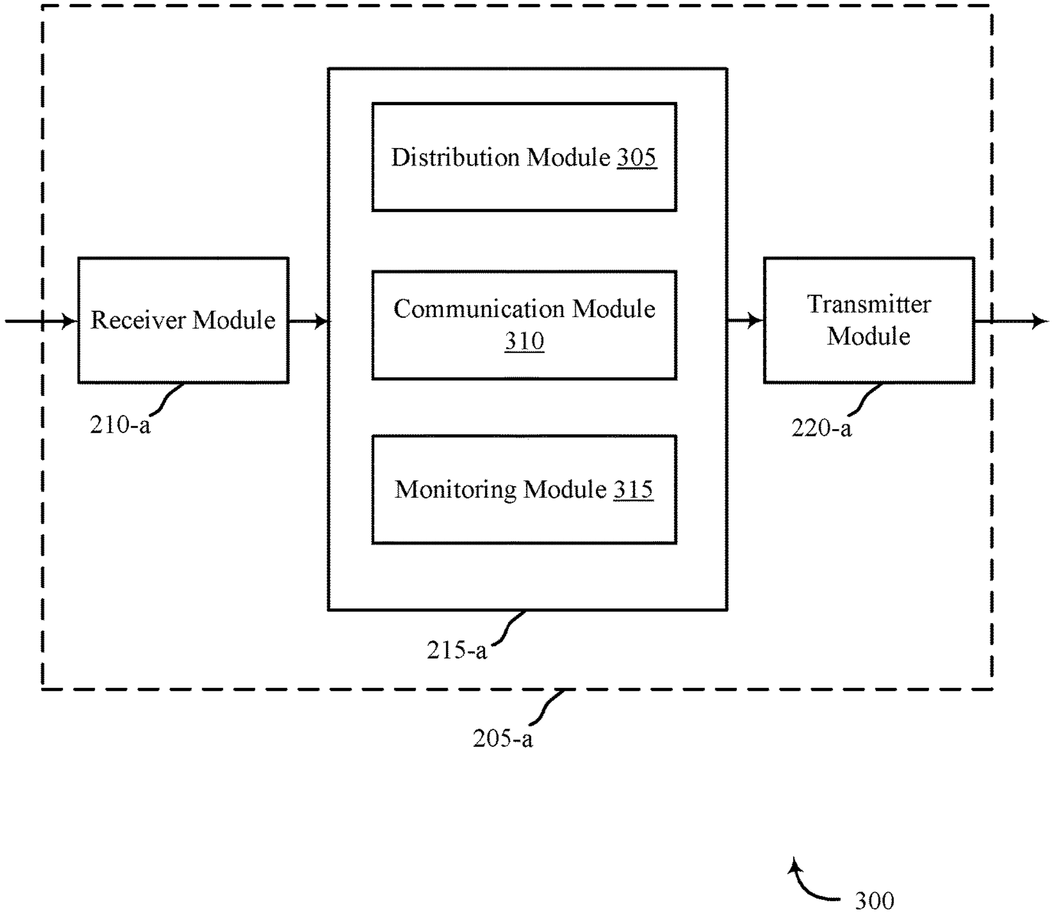
FIG. 3 shows a block diagram of a device relating to a security and/or an automation system, in accordance with various aspects of this disclosure.

FIG. 3 shows a block diagram 300 of an apparatus 205-*a* for use in wireless and/or wired communication, in accordance with various examples. The apparatus 205-*a* may be an example of one or more aspects of a control panel 135 and/or device 115 described with reference to FIG. 1. It may also be an example of an apparatus 205 described with reference to FIG. 2. The apparatus 205-*a* may include a receiver module 210-*a*, a power management module 215-*a*, and/or a transmitter module 220-*a*, which may be examples of the corresponding modules of apparatus 205. The apparatus 205-*a* may also include a processor. Each of these components may be in communication with each other. The power management module 215-*a* may include distribution module 305, communication module 310, and monitoring module 315. The receiver module 210-*a* and the transmitter module 220-*a* may perform the functions of the receiver module 210 and the transmitter module 220, of FIG. 2, respectively. Alternatively, the receiver module 210-*a* and the transmitter module 220-*a* may perform additional and/or different functions from the receiver module 210 and the transmitter module 220, of FIG. 2, respectively.

In one embodiment, distribution module 305 may receive, at a power adapter, power from a power supply. In some cases, the power adapter may be in communication (e.g., wired, wireless), via doorbell wiring, with a doorbell chime. Additionally, or alternatively, the power adapter may be in communication (e.g., wired, wireless), via doorbell wiring, with a doorbell unit and/or the power supply. The power from the power supply may be received by the power adapter via the doorbell wiring. In some cases, the power supply includes a doorbell transformer that transforms incoming electricity. For example, the doorbell transformer may transform 120 volt alternating current (AC) power coming into a home into 12 volt and/or 24 volt direct current (DC) power. Thus, the doorbell unit, the power adapter, and/or the chime may be powered using the transformed DC current and/or may power one or more elements such as processors, memory, sensors, etc. In some cases, the DC power may be used to provide current to a current source and/or charge an energy storage device such as a battery and/or capacitor, etc. Thus, the power adapter may control the distribution of DC power to power one or more elements of the power adapter, doorbell unit, and/or chime, as well as provide current to a current source and/or charge an energy storage device.

In one embodiment, the doorbell unit may include a doorbell button. The doorbell unit may include at least one sensor in addition to the doorbell button. For example, the doorbell unit may include an image sensor, a motion sensor, a proximity sensor, and/or an audio sensor. The doorbell unit may include a processor, memory, and/or communication hardware such as a receiver, transmitter, and/or a transceiver to communicate messages wirelessly and/or over a wire such as over the doorbell wiring. In some embodiments, at least a portion of the doorbell wiring includes preexisting doorbell wiring. The preexisting doorbell wiring may be used to power a previous doorbell unit prior to installing a new doorbell unit with the one or more sensors. For example, a previous doorbell unit may include only a button and may be wired to a power supply and a chime, and when the button is pressed a circuit is completed and the chime rings. As another example, a previous doorbell unit may include only an actuator and may be wired to a power supply and a chime, and when the actuator is actuated a circuit is completed and the chime rings. Thus, the new doorbell unit with the one or more sensors may use the existing two-wire doorbell wiring to power the new doorbell unit and/or to communicate messages over the wire.

In one embodiment, the distribution module 305 may route a first portion of the power received from the power supply to the doorbell unit. The first portion of power may be routed to power a device of the doorbell unit (e.g., a processor, sensor, etc.) when a doorbell button of the doorbell unit is not being pressed. Distribution module 305 may route a second portion of the power received from the power supply to both the device of the doorbell unit and the doorbell chime when the doorbell button is being pressed. For example, 75% of available power may be routed to power a device of the doorbell unit when the button is not being pressed, and then 45% of available power may be routed to power the doorbell unit and 45% of available power may be routed to power the doorbell chime when the button is being pressed.

In one embodiment, monitoring module 315 may monitor when the doorbell button of the doorbell unit is being pressed. In some cases, monitoring module 315 may monitor the doorbell button in conjunction with a processor of the doorbell unit. For example, a processor of the power adapter may communicate with a processor of the doorbell unit to monitor the doorbell button and determine when the doorbell button is being pressed and/or when it is not being pressed. In some embodiments, communication module 310 may modulate a power signal routed to the device of the doorbell unit. Communication module 310 may use any form of modulation such as frequency modulation, amplitude modulation, etc.

Additionally, or alternatively, communication module 310 may use digital modulation such as phase-shift keying, frequency-shift keying, amplitude-shift keying, on-off keying, quadrature amplitude modulation, etc. In some cases, communication module 310 may communicate data and/or deliver power via pulse width modulation. The communication module 310 may use a complete on/off digital modulation, and/or digitally modulate a signal that isn't all the way on or all the way off such as overlaying a data signal over a power signal. In some cases, distribution module 305 may feed pulsing power to a doorbell unit so that during dead cycles when the doorbell is momentarily not being powered by the pulsing power signal, the power may be stored in an energy storage device (e.g., battery, super capacitor, etc.). During the dead cycle the monitoring module 315 may monitor for the doorbell button being pressed. In some cases, distribution module 305 in conjunction with communication module 310 may modulate a power signal to enable monitoring module 315 to actively monitor and manipulate the power to detect when a button is being pressed and then ring the chime when the button is detected as being pressed.

The power management module 215-*a* thus controls how much power is used to ring the chime, sending a portion of the power to the chime, while continuing to send the pulses of power to one or more sensors of the doorbell unit as the button is pressed. In some cases, the data may be communicated over the doorbell wiring. Communication module 310 may communicate data to the power adapter via the modulated power signal. In some cases, the data may indicate whether the doorbell button is being pressed. Thus, communication module 310 may modulate a signal to send a modulated data message to the power adapter indicating that the doorbell button is being pressed.

In one embodiment, distribution module 305 may route a portion of the power received from the power supply to a rechargeable energy storage unit when the doorbell button is not being pressed. Thus, when monitoring module 315 indicates the button is not being pressed, distribution module 305 may route power to charge the rechargeable energy storage unit. In some cases, the portion of the power routed to the rechargeable energy storage unit varies according to a determination made by a processor of the doorbell unit and/or a processor of the power adapter. In some cases, a processor in the chime may at least in part determine the amount of power routed to the rechargeable energy storage unit.

Additionally, or alternatively, an external processor in a control panel and/or a computing device (e.g., smartphone, tablet, laptop, desktop, etc.) may at least in part determine the amount of power routed to the rechargeable energy storage unit. The rechargeable energy storage unit may include at least one of a rechargeable battery, fuel cell, and capacitor. The rechargeable energy storage unit may be configured to provide power to both the device of the doorbell unit and the doorbell chime when the doorbell button is being pressed. Thus, a first portion of power may be routed to power a device of the doorbell unit and a second portion of the power received from the power supply to a rechargeable energy storage unit when a doorbell button of the doorbell unit is not being pressed, where the first and second portions are either the same (e.g., 45% of available power to each, etc.) or the portions are different (e.g., 55% of available power to device of the doorbell unit and 35% of available power to rechargeable energy storage unit, etc.). When the button is actuated or triggered, power from the rechargeable energy storage unit may be used to power the doorbell unit and/or the chime. In some cases, the rechargeable energy storage unit may power the device of the doorbell unit while the power adapter routes a portion of power to the chime when the doorbell button is being pressed.

Figure 4:
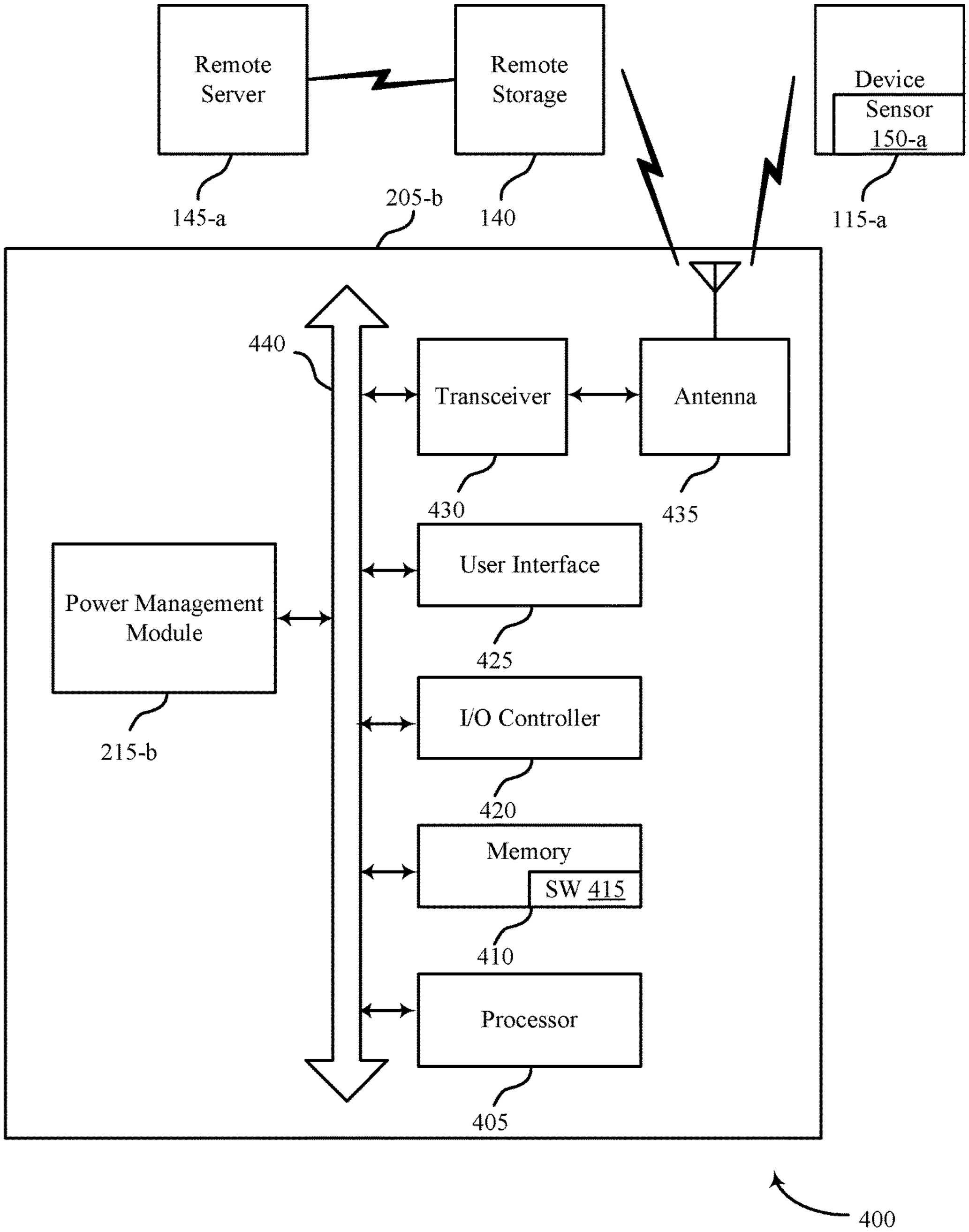
FIG. 4 shows a block diagram relating to a security and/or an automation system, in accordance with various aspects of this disclosure.

FIG. 4 shows a system 400 for use in power management systems, in accordance with various examples. System 400 may include an apparatus 205-*b*, which may be an example of the control panels 105 and/or device 115 of FIG. 1. Apparatus 205-*b* may also be an example of one or more aspects of apparatus 205 and/or 205-*a* of FIGS. 2 and 3.

Apparatus 205-*b* may include components for bi-directional voice and data communications including components for transmitting communications and components for receiving communications. For example, apparatus 205-*b* may communicate bi-directionally with one or more of device 115-*a*, one or more sensors 150-*a*, remote storage 140, and/or remote server 145-*a*, which may be an example of the remote server of FIG. 1. This bi-directional communication may be direct (e.g., apparatus 205-*b* communicating directly with remote storage 140) or indirect (e.g., apparatus 205-*b* communicating indirectly with remote server 145-*a* through remote storage 140).

Apparatus 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 140, and/or remote server 145-*a*. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 145-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, image, audio, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of apparatus 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive power from a doorbell power transformer and manage the distribution of the received power to control how much power to use to ring a chime while continuing to send pulses of power to one or more sensors of a doorbell unit as a doorbell button is pressed, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the power management module 215 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-*b*) may include a single antenna 435, the control panel or control device (e.g., 205-*b*) may have multiple antennas 435 capable of concurrently transmitting and/or receiving multiple wireless transmissions. The apparatus 205-*b* may include a power management module 215-*b*, which may perform the functions described above for the power management modules 215 of apparatus 205 of FIGS. 2 and 3. In some embodiments, the power management module 215-*b* may manage power among two or more sensors. The power management module 215-*b* may provide a first voltage to a first sensor (e.g., 5 VDC) and a second voltage to a second sensor (e.g., 12 VDC), etc.

Figure 5:
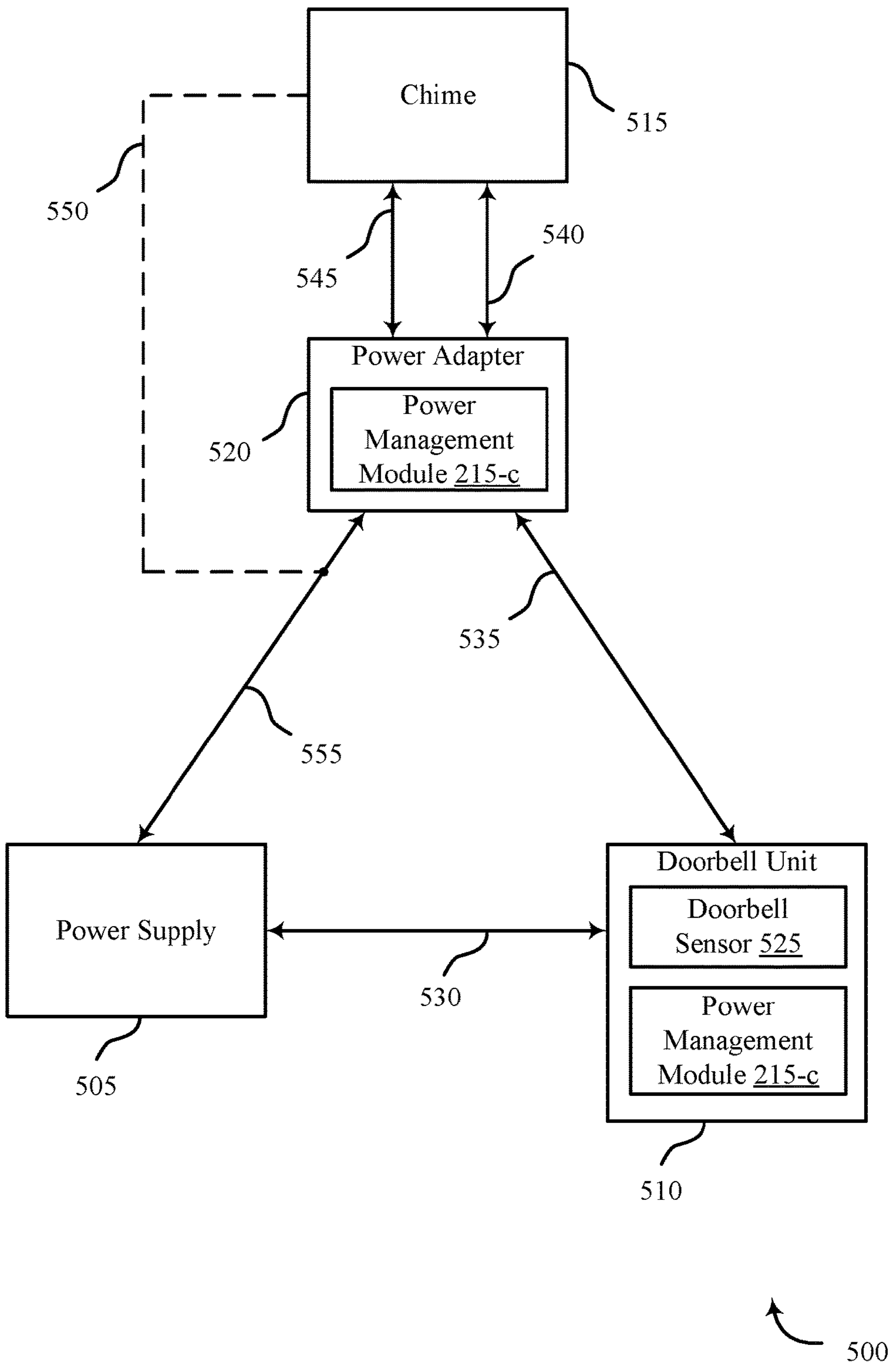
FIG. 5 shows a block diagram relating to a security and/or an automation system, in accordance with various aspects of this disclosure.

FIG. 5 shows a block diagram 500 relating to an electrical system, in accordance with various aspects of this disclosure. The block diagram 500 may include a power supply 505, doorbell unit 510, chime 515, and power adapter 520. Doorbell unit 510 may include one or more devices such as a doorbell button and one or more sensors. As illustrated, doorbell unit 510 includes doorbell sensor 525. In some embodiments, doorbell sensor 525 may be one example of sensors 150 illustrated in FIGS. 1 and 4. In some embodiments, doorbell sensor 525 may be different than the examples of sensors 150 illustrated in FIGS. 1 and 4. Power adapter 520 may include power management module 215-*c*, which may perform the functions described above for the power management modules 215 of apparatus 205 of FIGS. 2, 3, and 4. Additionally, or alternatively, doorbell unit 510 may include power management module 215-*c*, which may perform the functions described above for the power management modules 215 of apparatus 205 of FIGS. 2, 3, and 4. Additionally, or alternatively, another element of the system may include power management module 215-*c*, which may perform the functions described above for the power management modules 215 of apparatus 205 of FIGS. 2, 3, and 4.

In some embodiments, at least a portion of power management module 215-*c* may be housed within the power adapter 520 and at least a portion of power management module 215-*c* may be housed within doorbell unit 510. In some embodiments, at least a portion of power management module 215-*c* may be housed separate from the power adapter 520 and at least a portion of power management module 215-*c* may be housed separate from doorbell unit 510. In some embodiments, a redundant copy of power management module 215-*c* may be included in power adapter 520 and/or doorbell unit 510. In some cases, chime 515 may include at least a portion of power management module 215-*c*. Thus, at least a portion of the functions of power management module 215-*c* may be performed within doorbell unit 510, chime 515, and/or power adapter 520.

In some embodiments, one or more elements of any of the present systems and/or methods may be housed within a single structure. In some embodiments, one or more elements of any of the present systems and/or methods may be housed within multiple structures. In addition, in some embodiments, one or more elements of any of the present systems and/or methods may be housed in different elements of the system than those specifically discussed here.

In one embodiment, power adapter 520 may be configured to control power actuation of chime 515 in conjunction with doorbell unit 510. A conventional doorbell circuit may have a current loop from the power supply 505 to doorbell unit 510, from doorbell unit 510 to chime 515, and from chime 515 to power supply 505, completing the circuit. In some embodiments, the connections between one or more elements may be direct and/or indirect. As illustrated, a power adapter 520 may be placed between the chime 515 and the power supply 505, and between the chime 515 and the doorbell unit 510. In some embodiments, a current loop may run from power supply 505 to doorbell unit 510, from doorbell unit 510 to power adapter 520, and from power adapter 520 to power supply 505, making a complete circuit. Additionally, or alternatively, a current loop may run from power supply 505 to doorbell unit 510, from doorbell unit 510 to power adapter 520, from power adapter 520 to chime 515, from chime 515 to power adapter 520, and from power adapter 520 to power supply 505, making a complete circuit. In some cases, the current may run from chime 515 to power supply 505 via wire 545 to wire 555 through power adapter 520. Additionally, or alternatively, the current may bypass power adapter 520 and run from chime 515 to power supply 505 via wire 550 and wire 555.

Wire 535 may conduct a signal between doorbell unit and power adapter 520. The current may be direct current (DC) or alternating current (AC). In some cases, current conducted over wire 535 may be unidirectional. In some cases, the current conducted over wire 535 may be bi-directional. For example, power adapter 520 may communicate a message and/or a signal to doorbell unit 510 over wire 535. Likewise, doorbell unit 510 may communicate a message to power adapter 520. As one example, doorbell unit 510 may receive manual and/or automated activation to fire (e.g., activate) chime 515. For instance, pressing the doorbell button may trigger a manual activation and a control panel sending a command to doorbell unit 510 and/or power adapter 520 may trigger an automated activation. Doorbell unit 510 may relay a message received from a control panel to power adapter 520 to fire the chime. In some cases, power adapter 520 may receive a message directly from the control panel. The power adapter 520 may then send an electrical current over wire 540 to chime 515 to fire the chime. As illustrated, the electrical current may return to the power supply 505 via wire 545 to power adapter 520 and wire 555 to power supply 505. In some cases, the electrical current may return to power supply 505 via wire 550 to wire 555 to power supply 505.

In some embodiments, a doorbell may include two wires to a doorbell unit, one wire from a power supply and another wire from a chime. In some embodiments, wire 535 between doorbell unit 510 and power adapter 520 may be one of the two wires in a conventional doorbell wiring. In some embodiments, wire 530 between power supply 505 and doorbell unit 510 may be the other of these two wires. Thus, doorbell unit 510 and/or power adapter 520 may be wired using existing two-wire doorbell wiring. For example, doorbell unit 510 may replace a conventional doorbell button and use the existing doorbell wiring. Likewise, power adapter 520 may be installed as a control interface to chime 515 using existing doorbell wiring.

Figure 6:
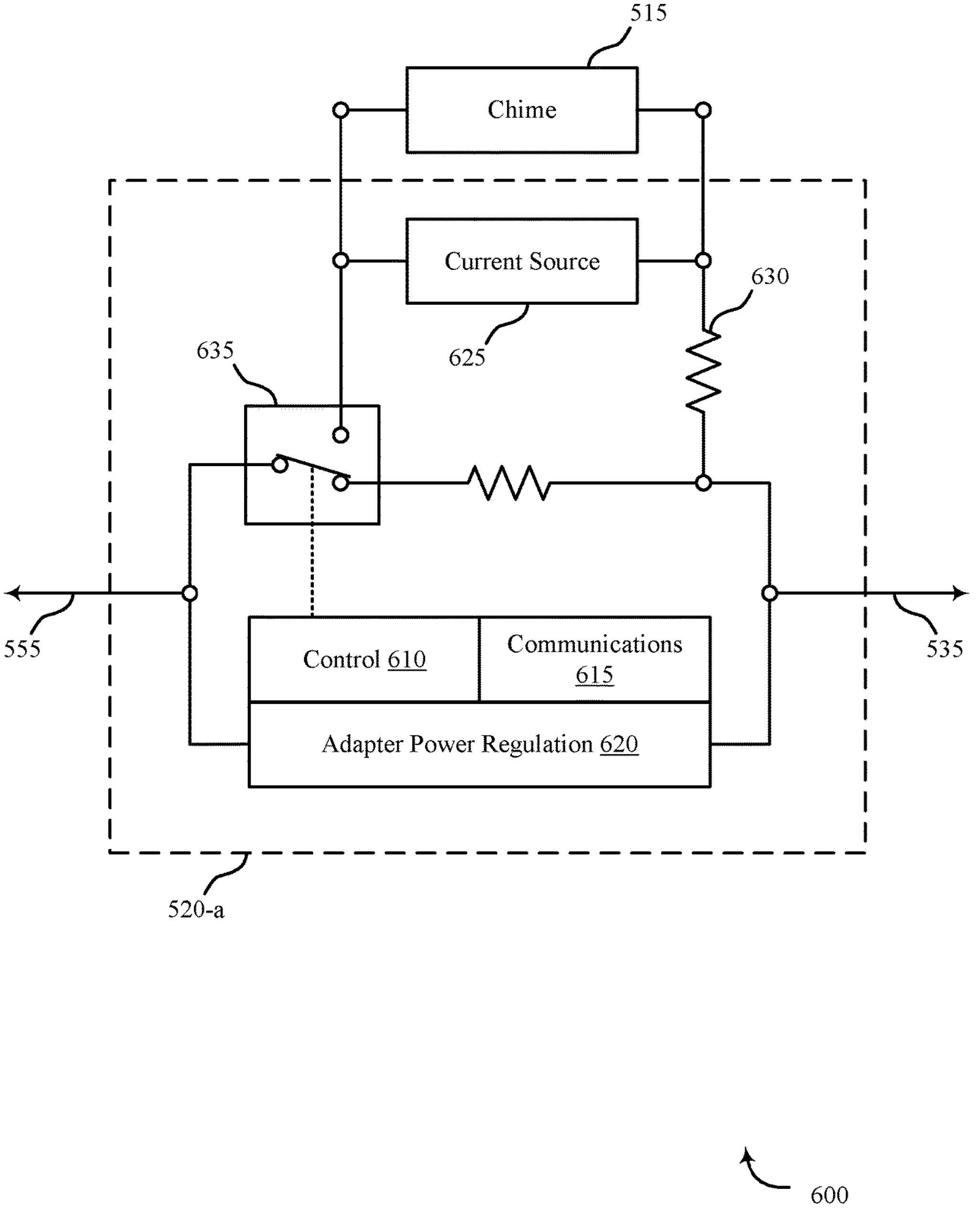
FIG. 6 shows a block diagram relating to a security and/or an automation system, in accordance with various aspects of this disclosure.

FIG. 6 shows a block diagram 600 relating to an electrical system, in accordance with various aspects of this disclosure. The block diagram 600 depicts an electrical system that provides a direct current to doorbell unit 510 when a button of the doorbell unit 510 is being actuated. As illustrated, block diagram 600 includes a depiction of power adapter

520-*a*. The power adapter 520-*a* may perform the functions of the power adapter 520 of FIG. 5. As illustrated, power adapter 520-*a* may connect to chime 515 and/or wires 555 and 535 from FIG. 5. The power adapter 520-*a* may include control 610, communications 615, and/or adapter power regulation 620. Power adapter 520-*a* may also include current source 625, current sensing resistor 630, and/or a switch 635. The switch 635 may include a triode, bidirectional triode thyristor, bilateral triode thyristor, and/or triode for alternating current (TRIAC).

In one embodiment, control 610 may include one or more processors and/or memory to control a distribution of power received from power supply 505 (via wire 555) to power both chime 515 and doorbell unit 510 regardless of whether the doorbell button is being pressed. Communications 615 may include a receiver (e.g., receiver module 210), a transmitter (e.g., transmitter module 220), and/or a transceiver (e.g., transceiver module 430) to send and/or receive communication data. For example, communications 615 may receive a signal via wire 535 indicating a doorbell button on doorbell unit 510 is being pressed. Communications 615 may communicate the data to control 610, and control 610 may control switch 635 to divert power to chime 515 to ring the doorbell.

Figure 7:
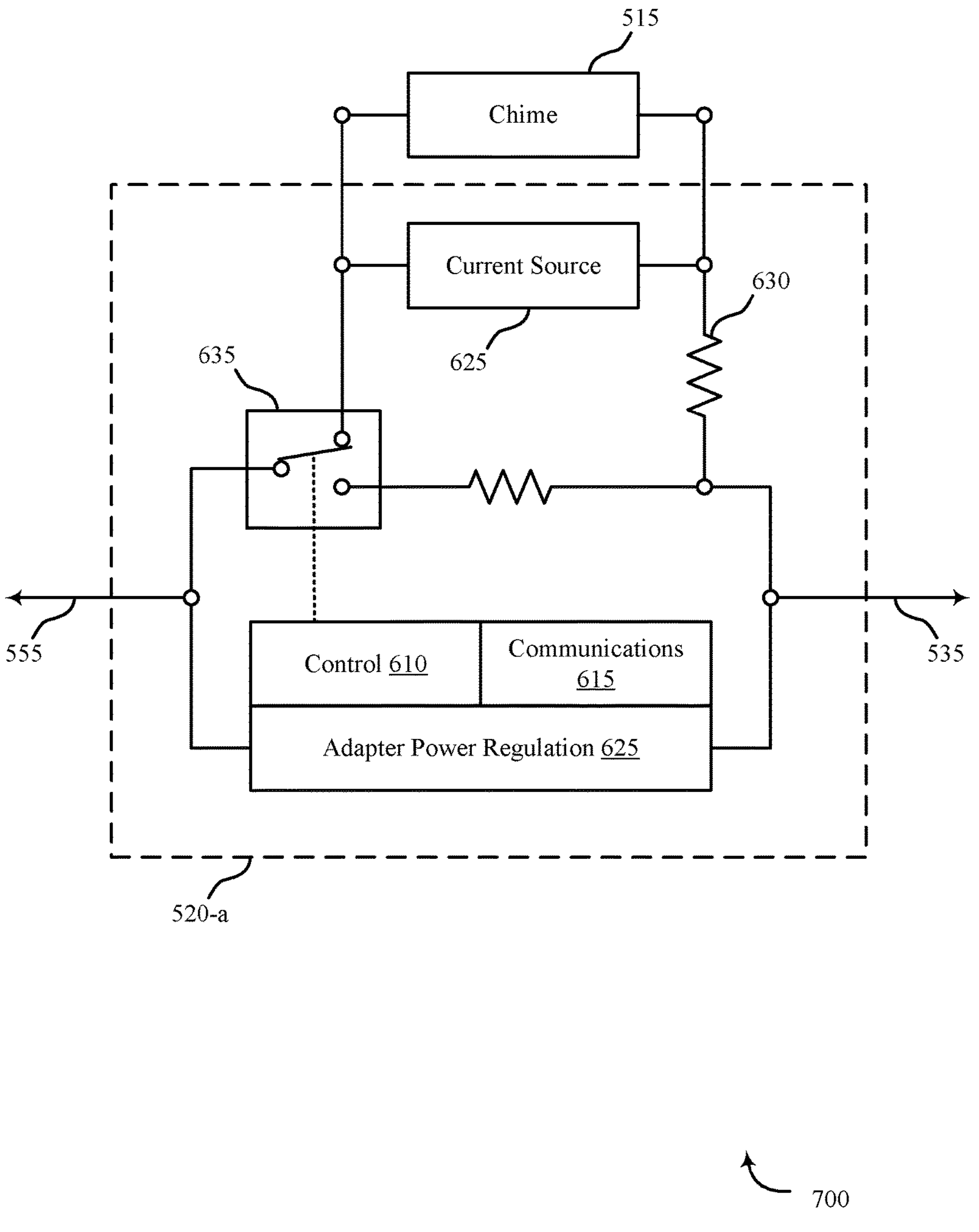
FIG. 7 shows a block diagram relating to a security and/or an automation system, in accordance with various aspects of this disclosure.

FIG. 7 shows a block diagram 700 relating to an electrical system, in accordance with various aspects of this disclosure. As illustrated, switch 635 of power adapter 520-*a* is activated to provide power to chime 515 to allow chime 515 to ring a doorbell. As indicated above, control 610 directs adapter power regulation 620 to alter switch 635 to provide power to chime 515. As depicted, switching the switch 635 also provides power to current source 625, which provides power to doorbell unit 510. Current sensing resistor 630 is placed in the current path to doorbell unit 510 to allow the current to be measured. Thus, control 610 is enabled to control and/or monitor the amount of current provided to doorbell unit 510 via current sensing resistor 630.

Figure 8:
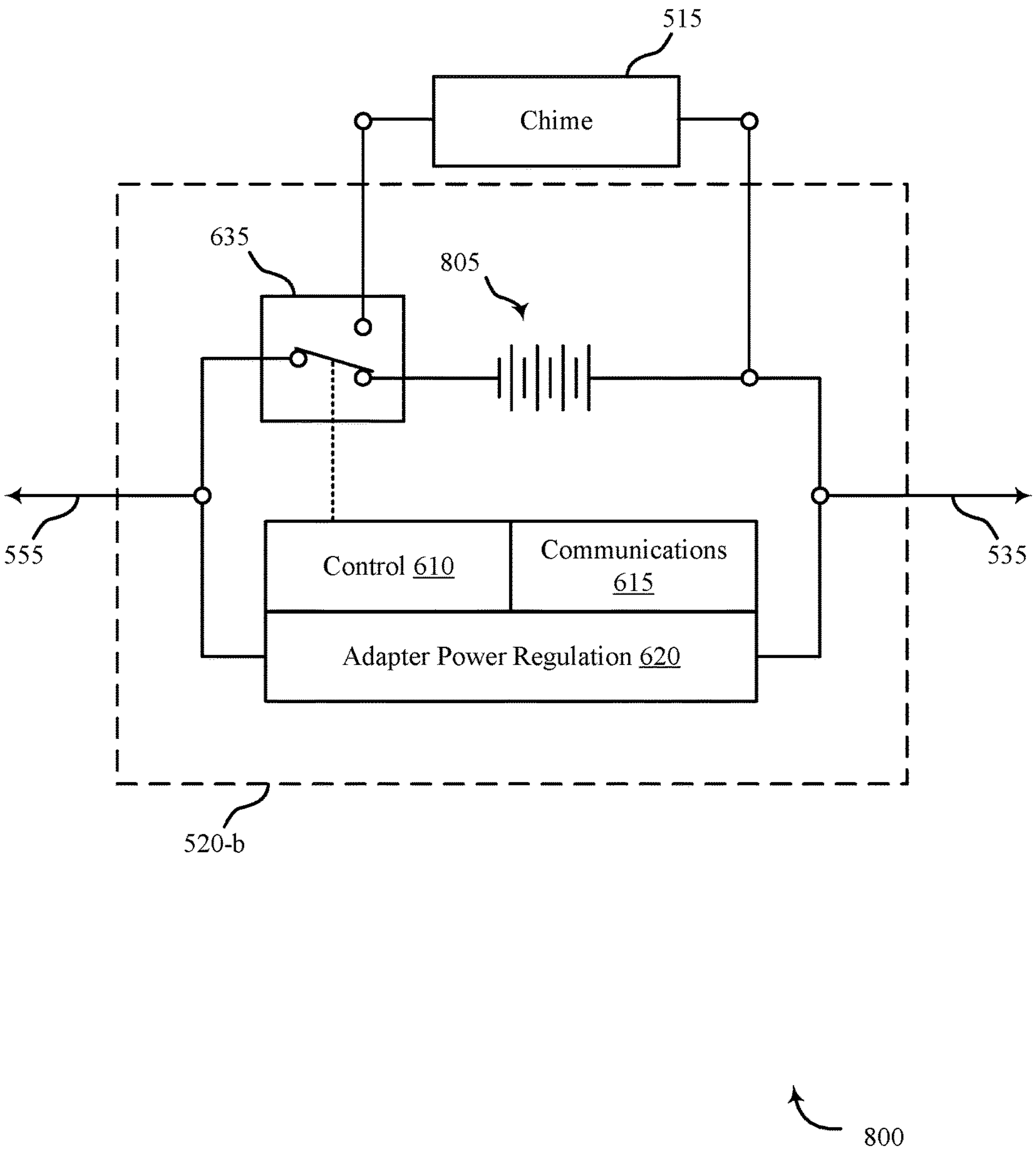
FIG. 8 shows a block diagram relating to a security and/or an automation system, in accordance with various aspects of this disclosure.

FIG. 8 shows a block diagram 800 relating to an electrical system, in accordance with various aspects of this disclosure. The block diagram 800 depicts an electrical system that provides stored electrical current to doorbell unit 510 when a button of the doorbell unit 510 is being actuated. As illustrated, block diagram 800 includes a depiction of power adapter 520-*b*. The power adapter 520-*b* may perform the functions of the power adapter 520 of FIG. 5-7. Power adapter 520-*b* may include an energy storage device 805. The energy storage device 805 may include a battery, rechargeable battery, flow battery, fuel cell, capacitor, and/or super-capacitor to store electrical and/or chemical energy. The energy storage device 805 may be configured to store energy and provide the stored energy as directed power management module 215.

Figure 9:
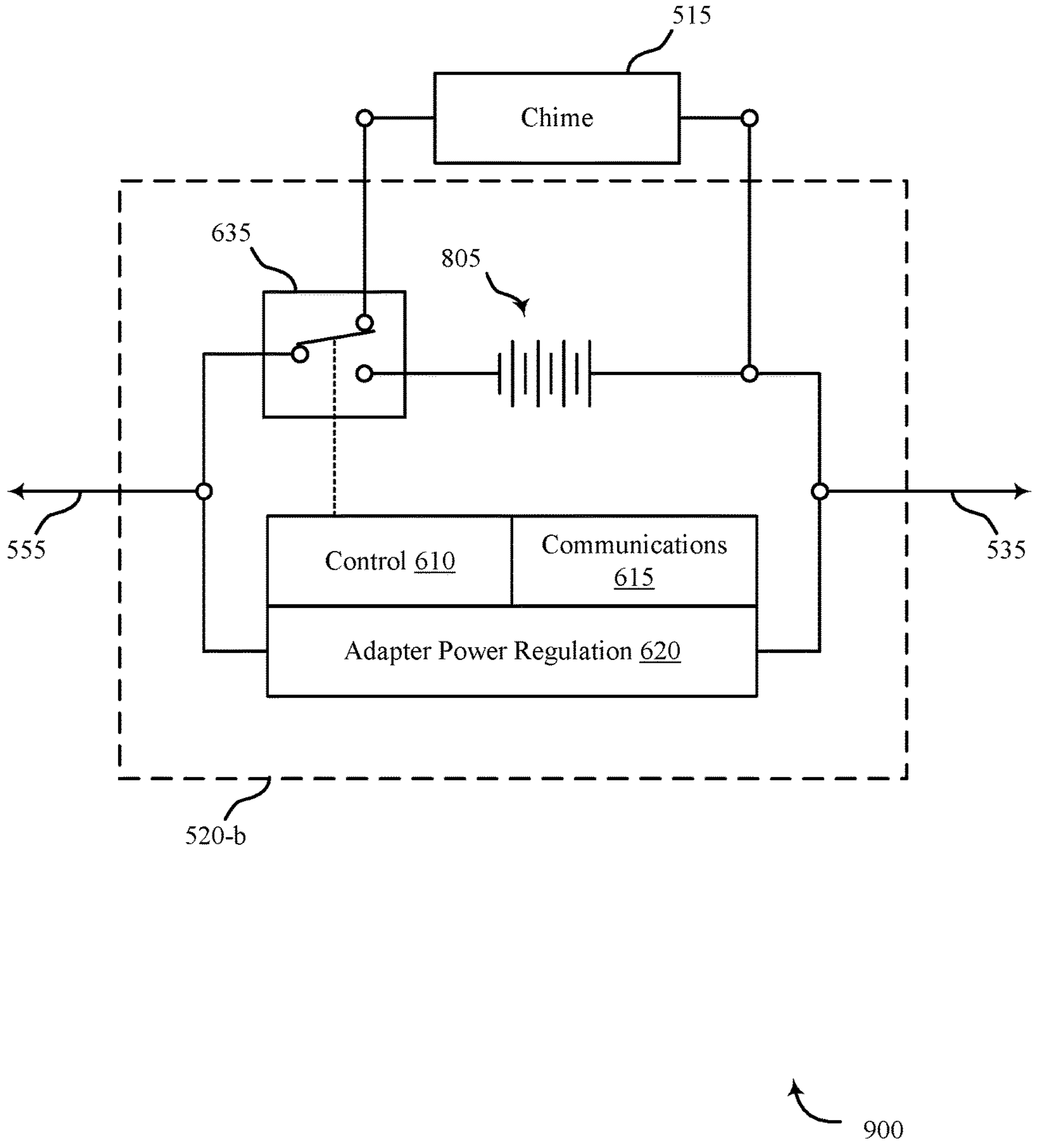
FIG. 9 shows a block diagram relating to a security and/or an automation system, in accordance with various aspects of this disclosure.

FIG. 9 shows a block diagram 900 relating to an electrical system, in accordance with various aspects of this disclosure. As illustrated, block diagram 900 depicts switch 635 being switched to provide power to chime 515 to allow chime 515 to ring the doorbell. While switch 635 is switched to provide power to chime 515, energy storage device 805 provides stored power to doorbell unit 510 via wire 535. Thus, whether the doorbell button is pressed or not, power adapter 520-*b* provides power to doorbell unit 510 via wire 535.

Figure 10:
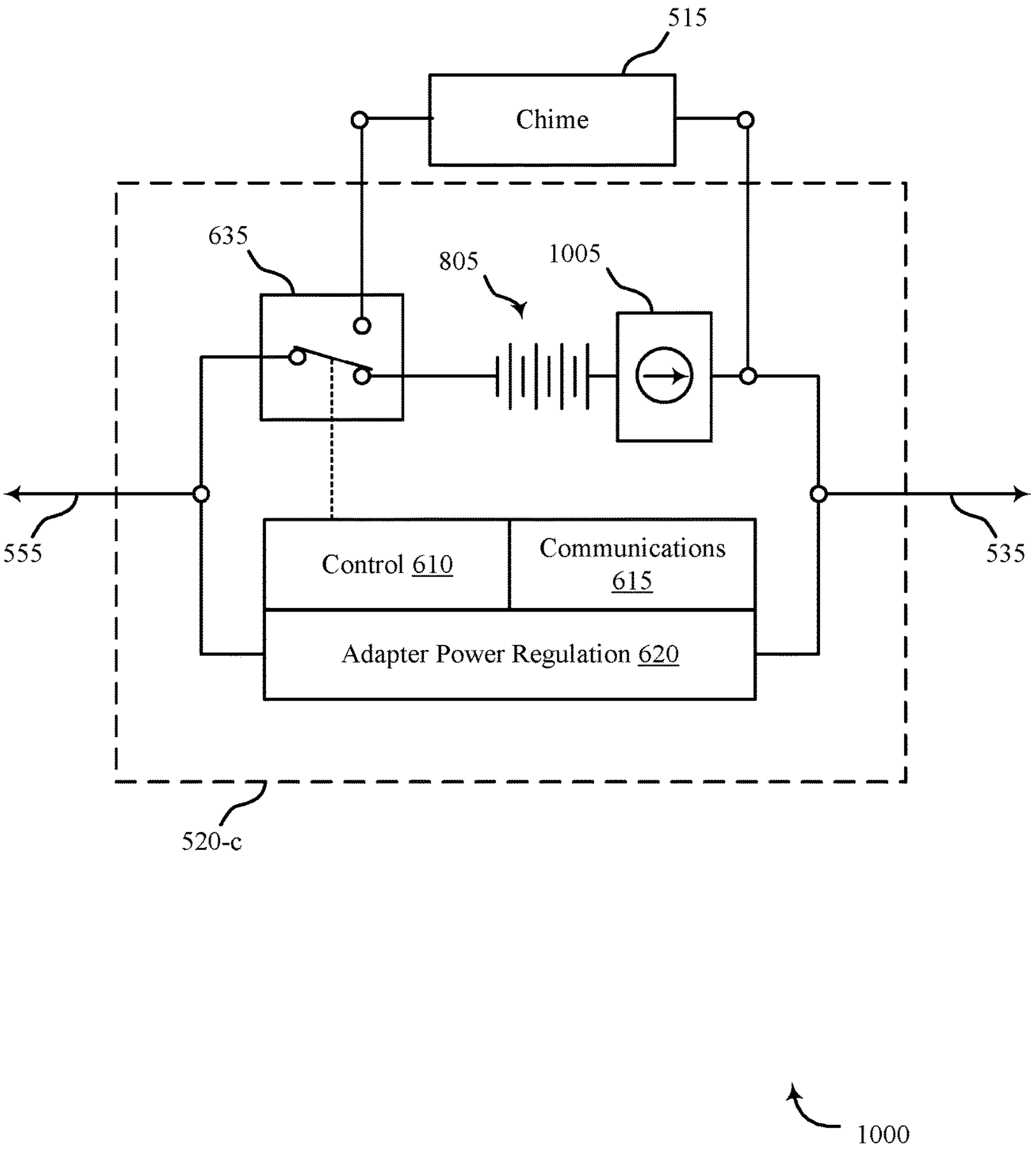
FIG. 10 shows a block diagram relating to a security and/or an automation system, in accordance with various aspects of this disclosure.

FIG. 10 shows a block diagram 1000 relating to an electrical system, in accordance with various aspects of this disclosure. The block diagram 1000 depicts an electrical system that provides variable stored electrical current to doorbell unit 510 when a button of the doorbell unit 510 is being actuated. As illustrated, block diagram 1000 includes a depiction of power adapter 520-*c*. The power adapter 520-*c* may perform the functions of the power adapter 520 of FIGS. 5-9. Power adapter 520-*c* may include a current adjuster 1005. The current adjuster 1005 may include a varistor, potentiometer, etc. The current adjuster 1005 may vary the amount of power to charge the energy storage device 805. The amount of power used to charge the energy storage device 805 may be determined by a processor of the doorbell unit 510. In some cases, the amount of power may be determined by system components and/or sensor specifications. For example, a first sensor may be rated for 5 VDC operation while another sensor may be rated for 12 VDC operation. The processor may be configured to detect the operating voltage and/or be programmed to provide a certain voltage.

Figure 11:
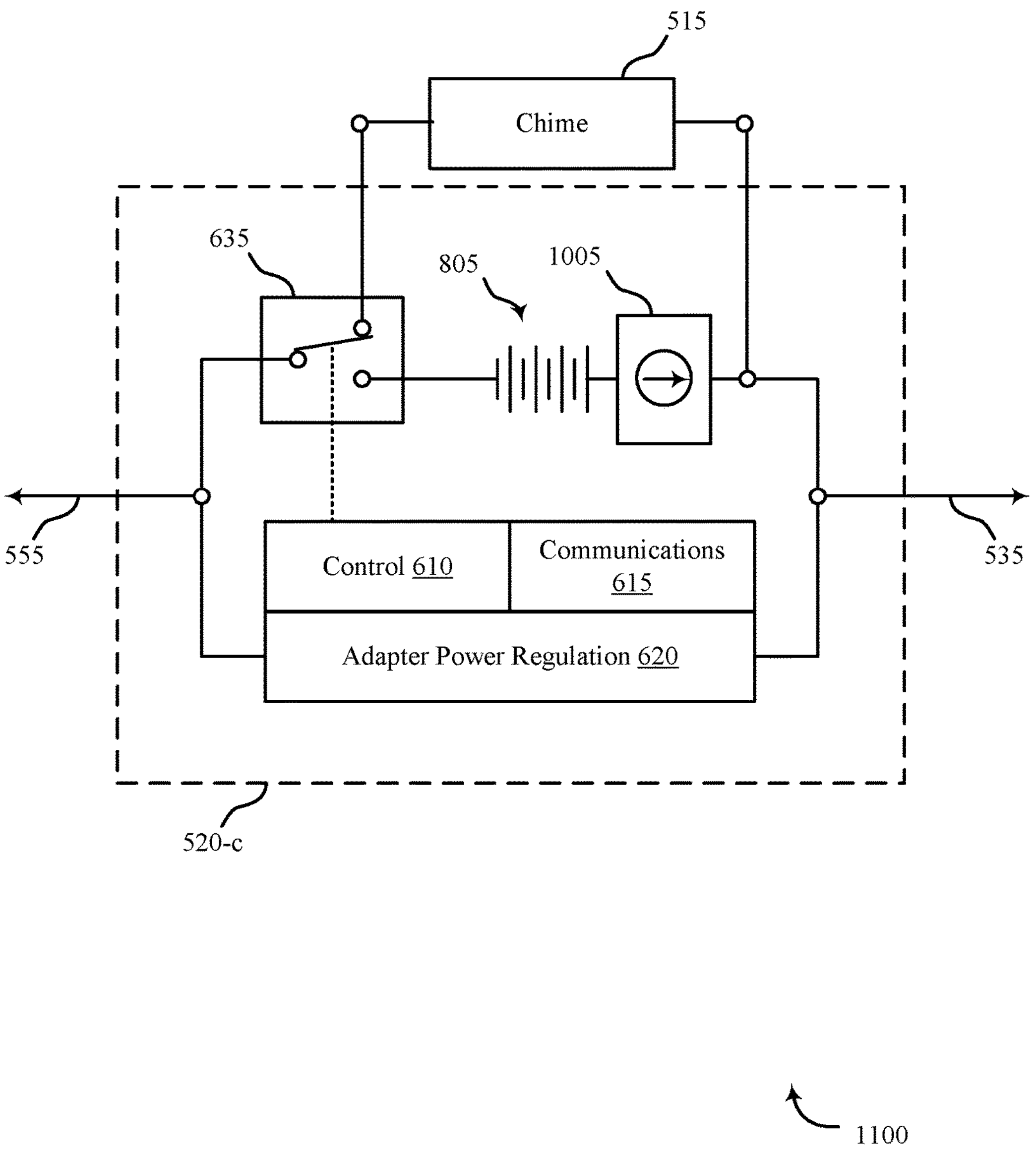
FIG. 11 shows a block diagram relating to a security and/or an automation system, in accordance with various aspects of this disclosure.

FIG. 11 shows a block diagram 1100 relating to an electrical system, in accordance with various aspects of this disclosure. As illustrated, block diagram 1100 depicts switch 635 of power adapter 520-*c* being switched to provide power to chime 515 to allow chime 515 to ring the doorbell. While switch 635 is switched to provide power to chime 515, energy storage device 805 provides stored power to doorbell unit 510 via wire 535. Thus, whether the doorbell button is pressed or not, power adapter 520-*c* provides power to doorbell unit 510 via wire 535.

Figure 12:
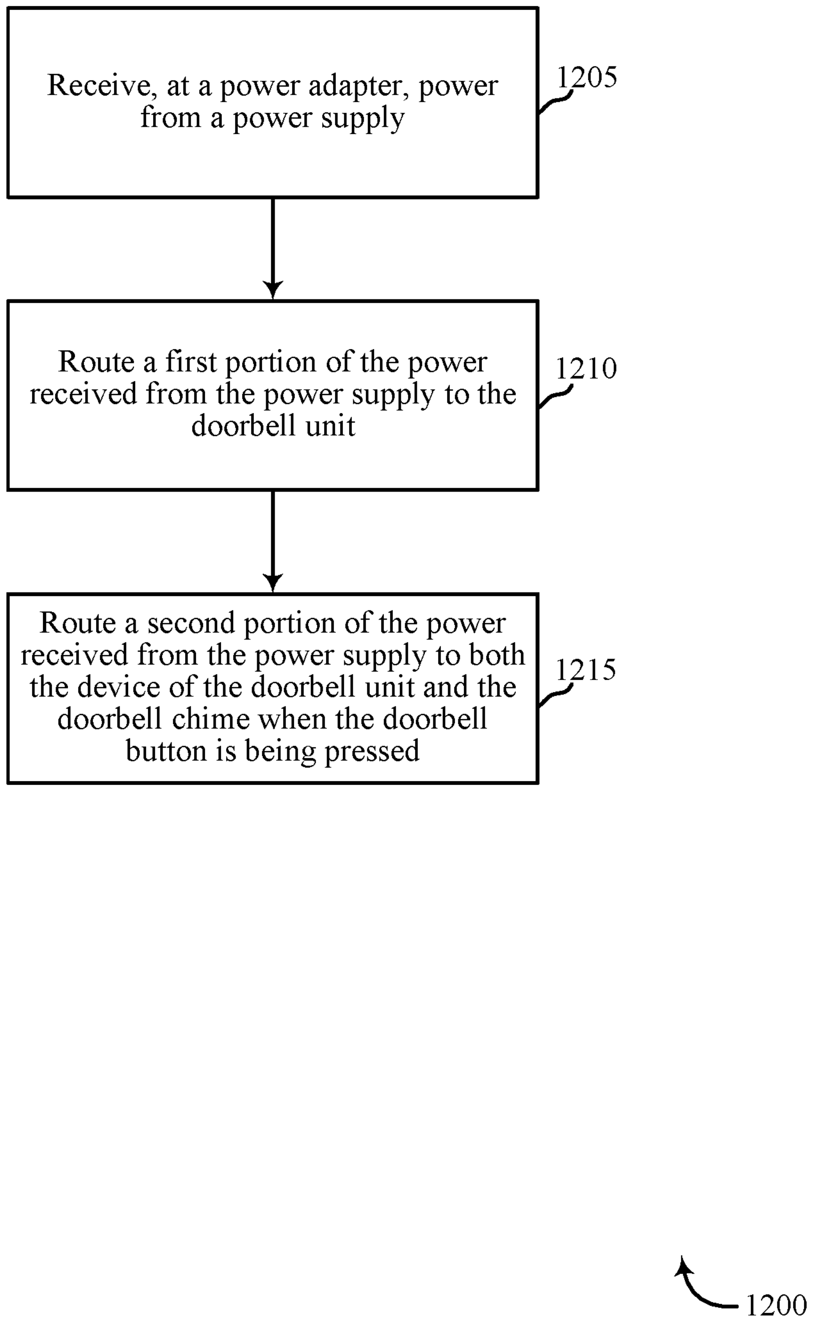
FIG. 12 is a flow chart illustrating an example of a method relating to a security and/or an automation system, in accordance with various aspects of this disclosure.

FIG. 12 is a flow chart illustrating an example of a method 1200 for power management, in accordance with various aspects of the present disclosure. For clarity, the method 1200 is described below with reference to aspects of one or more of the sensing units 150 described with reference to FIGS. 1 and/or 4. In some examples, a control panel, backend server, mobile computing device, and/or sensor may execute one or more sets of codes to control the functional elements of the control panel, backend server, mobile computing device, and/or sensor to perform the functions described below. Additionally or alternatively, the control panel, backend server, mobile computing device, and/or sensor may perform one or more of the functions described below using special-purpose hardware.

At block 1205, power from a power supply may be received at a power adapter. The power supply may include a doorbell transformer. The power adapter may be wired, via doorbell wiring, to a doorbell chime, a doorbell unit, and/or the power supply. The power from the power supply may be received by the power adapter via the doorbell wiring. In some embodiments, at least a portion of the doorbell wiring may include pre-existing doorbell wiring. In some embodiments, the pre-existing doorbell wiring may be used to power a previous doorbell unit prior to installing the doorbell unit. In some cases, the doorbell unit may include a processor, memory, and/or one or more sensors such as an image sensor, a motion sensor, a proximity sensor, an audio sensor, etc.

At block 1210, a first portion of the power received from the power supply may be routed to the doorbell unit. In some embodiments, the first portion of power may be routed to power a device of the doorbell unit when a doorbell button of the doorbell unit is not being pressed. At block 1215, a second portion of the power received from the power supply may be routed to both the device of the doorbell unit and the doorbell chime when the doorbell button is being pressed. In some embodiments, the second portion may be the same or different than the first portion. In some embodiments, the second portion of the power may include power stored in an energy storage device such as a battery and/or capacitor. In some embodiments, the energy storage device may be charged using power provided by the power supply. The operation(s) at block 1205-1215 may be performed using the power management module 215 described with reference to FIGS. 2-5.

Thus, the method 1200 may provide for power management relating to automation/security systems. It should be noted that the method 1200 is just one implementation and that the operations of the method 1200 may be rearranged or otherwise modified such that other implementations are possible.

Figure 13:
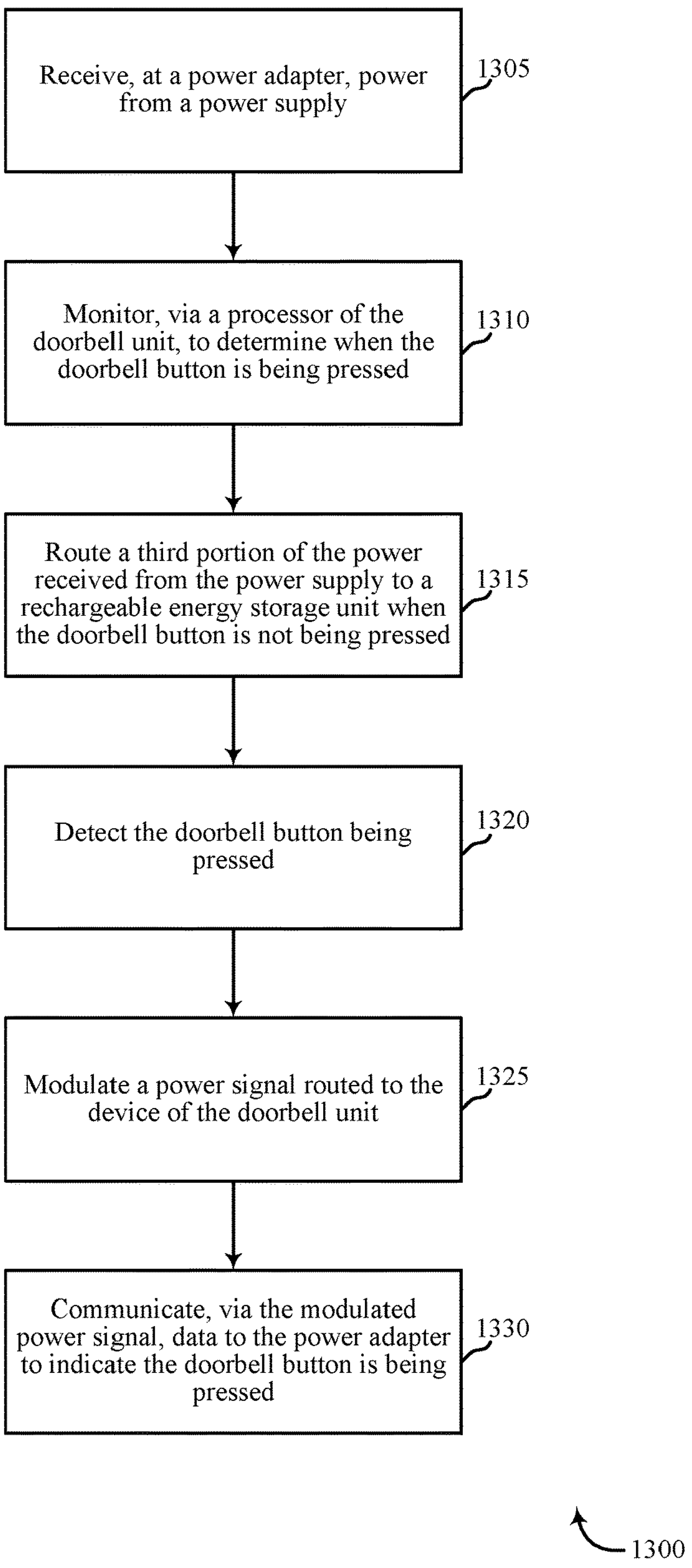
FIG. 13 is a flow chart illustrating an example of a method relating to a security and/or an automation system, in accordance with various aspects of this disclosure.

FIG. 13 is a flow chart illustrating an example of a method 1300 for power management, in accordance with various aspects of the present disclosure. For clarity, the method 1300 is described below with reference to aspects of one or more of the sensing units 150 described with reference to FIGS. 1 and/or 4. In some examples, a control panel, backend server, mobile computing device, and/or sensor may execute one or more sets of codes to control the functional elements of the control panel, backend server, mobile computing device, and/or sensor to perform the functions described below. Additionally or alternatively, the control panel, backend server, mobile computing device, and/or sensor may perform one or more of the functions described below using special-purpose hardware.

At block 1305, power from a power supply may be received at a power adapter. In some embodiments, the power adapter may be wired, via doorbell wiring, to a doorbell chime, a doorbell unit, and/or the power supply. In other embodiments, the power adapter may communicate wirelessly to a doorbell chime, a doorbell unit, and/or the power supply. At block 1310, the doorbell button may be monitored via a processor of the doorbell unit to determine when the doorbell button is being pressed and/or actuated.

At block 1315, a third portion of the power received from the power supply may be routed to a rechargeable energy storage unit when the doorbell button is not being pressed. In some embodiments, the third portion of the power routed to the rechargeable energy storage unit varies according to a determination made by at least one of a processor of the doorbell unit, a processor of the power adapter, a processor of a chime, a processor of a control panel, and/or a processor of an external computing device such as a smartphone, laptop, etc. In some cases, the rechargeable energy storage unit may include at least one of a rechargeable battery, a fuel cell, and a capacitor such as a super-capacitor. In other embodiments, the rechargeable energy storage unit may be configured to provide power to both the device of the doorbell unit and the doorbell chime when the doorbell button is being pressed. At block 1320, detect the doorbell button being pressed. At block 1325, a power signal routed to the device of the doorbell unit may be modulated. At block 1330, data may be communicated to the power adapter via the modulated power signal. The data may indicate whether the doorbell button is being pressed. In some cases, the data may be communicated over the doorbell wiring.

At least some of the operations at blocks 1305-1330 may be performed using the power management module 215 described with reference to FIGS. 2-5. Thus, the method 1300 may provide for power management relating to electrical systems. It should be noted that the method 1300 is just one implementation and that the operations of the method 1300 may be rearranged or otherwise modified such that other implementations are possible.

In some examples, aspects from two or more of the methods 1200 and 1300 may be combined and/or separated. It should be noted that the methods 1200 and 1300 are just example implementations, and that the operations of the methods 1200 and 1300 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system, comprising:

receiving, at a power adapter, power from a power supply, wherein the power adapter is wired, via doorbell wiring, to a doorbell chime, a doorbell unit, and the power supply;

routing a first portion of the power received from the power supply to the doorbell unit, the first portion of the power being routed to power a device of the doorbell unit when a doorbell button of the doorbell unit is not being actuated;

receiving, at a processor of the security and/or automation system, a signal to actuate the doorbell button from a mobile device;

routing a second portion of the power received from the power supply to both the device of the doorbell unit and the doorbell chime when the doorbell button is being actuated;

determining an amount of the second portion of the power received from the power supply based at least in part on one or more of an amount of power provided by the power supply, an amount of power currently being used, and a number of devices presently using the provided power; and providing data to a doorbell adapter, wherein the data indicates a value associated with the second portion of the power.

2. The method of claim 1, further comprising:

actuating the doorbell button according to the received signal.

3. The method of claim 1, further comprising:

modulating a power signal routed to the device of the doorbell unit;

monitoring, via the processor, to determine when the doorbell button is being actuated; and communicating, via the modulated power signal, data to the power adapter, wherein the data indicates whether the doorbell button is being actuated, and wherein the data is communicated over the doorbell wiring.

4. The method of claim 1, further comprising:

routing a third portion of the power received from the power supply to a rechargeable energy storage unit when the doorbell button is not being actuated.

5. The method of claim 4, wherein the third portion of the power routed to the rechargeable energy storage unit varies according to a determination made by at least one of a processor of the doorbell unit and a processor of the power adapter.

6. The method of claim 4, wherein the rechargeable energy storage unit comprises at least one of a rechargeable battery, fuel cell, and capacitor, the rechargeable energy storage unit being configured to provide power to both the device of the doorbell unit and the doorbell chime when the doorbell button is being actuated.

7. The method of claim 1, wherein at least a portion of the doorbell wiring comprises preexisting doorbell wiring, the preexisting doorbell wiring being used to power a previous doorbell unit prior to installing the doorbell unit.

8. The method of claim 1, wherein receiving power from the power supply further comprises receiving, at the power adapter, a pulsing power signal from the power supply, the method further comprising:

storing power in a rechargeable energy storage unit during dead cycles of the pulsing power when the doorbell is momentarily not being powered by the pulsing power signal.

9. An apparatus for security and/or automation systems, comprising:

a processor;

memory in electronic communication with the processor; and instructions stored in the memory, the instructions being executable by the processor to:

receive, at the apparatus, power from a power supply, wherein the apparatus is wired via doorbell wiring to a doorbell chime, a doorbell unit, and the power supply;

route a first portion of the power received from the power supply to the doorbell unit, the first portion of power being routed to power a device of the doorbell unit when a doorbell button of the doorbell unit is not being actuated;

receive, at the processor, a signal to actuate the doorbell button from a mobile device;

route a second portion of the power received from the power supply to both the device of the doorbell unit and the doorbell chime when the doorbell button is being actuated;

determine an amount of the second portion of the power received from the power supply based at least in part on one or more of an amount of power provided by the power supply, an amount of power currently being used, and a number of devices presently using the provided power; and provide data to a doorbell adapter, wherein the data indicates a value associated with the second portion of the power.

10. The apparatus of claim 9, the instructions being executable by the processor to:

actuate the doorbell button according to the received signal.

11. The apparatus of claim 9, the instructions being executable by the processor to:

modulate a power signal routed to the device of the doorbell unit;

monitor to determine when the doorbell button is being actuated; and communicate, via the modulated power signal, data to the apparatus, wherein the data indicates whether the doorbell button is being actuated, and wherein the data is communicated over the doorbell wiring.

12. The apparatus of claim 9, the instructions being executable by the processor to:

route a third portion of the power received from the power supply to a rechargeable energy storage unit when the doorbell button is not being actuated.

13. The apparatus of claim 12, wherein the third portion of the power routed to the rechargeable energy storage unit varies according to a determination made by the processor.

14. The apparatus of claim 12, wherein the rechargeable energy storage unit comprises at least one of a rechargeable battery, fuel cell, and capacitor, the rechargeable energy storage unit being configured to provide power to both the device of the doorbell unit and the doorbell chime when the doorbell button is being actuated.

15. A non-transitory computer-readable medium storing computer-executable code for security and/or automation systems, the code executable by a processor to:

receive, at a power adapter, power from a power supply, wherein the power adapter is wired via doorbell wiring to a doorbell chime, a doorbell unit, and the power supply;

route a first portion of the power received from the power supply to the doorbell unit, the first portion of power being routed to power a device of the doorbell unit when a doorbell button of the doorbell unit is not being actuated;

receive, at the processor, a signal to actuate the doorbell button from a mobile device;

route a second portion of the power received from the power supply to both the device of the doorbell unit and the doorbell chime when the doorbell button is being actuated;

determine an amount of the second portion of the power received from the power supply based at least in part on one or more of an amount of power provided by the power supply, an amount of power currently being used, and a number of devices presently using the provided power; and provide data to a doorbell adapter, wherein the data indicates a value associated with the second portion of the power.

16. The non-transitory computer-readable medium of claim 15, the code being executable by the processor to:

actuate the doorbell button according to the received signal.

* * * * *